United States Patent [19]

Ferguson

[11] Patent Number: 5,331,648
[45] Date of Patent: Jul. 19, 1994

[54] LASER SYSTEM
[75] Inventor: Alister I. Ferguson, Glasgow, Scotland
[73] Assignee: University of Strathclyde, Glasgow, Scotland
[21] Appl. No.: 934,685
[22] PCT Filed: Mar. 13, 1991
[86] PCT No.: PCT/GB91/00391
 § 371 Date: Sep. 8, 1992
 § 102(e) Date: Sep. 8, 1992
[87] PCT Pub. No.: WO91/14303
 PCT Pub. Date: Sep. 19, 1991
[51] Int. Cl.[5] .............................................. H01S 3/098
[52] U.S. Cl. ........................................ 372/18; 372/28; 372/32; 372/38
[58] Field of Search ................... 372/107, 108, 33, 38, 372/26, 28, 29, 31, 20, 32, 18

[56] References Cited
U.S. PATENT DOCUMENTS
3,711,786 1/1973 Vautier .
4,905,243 2/1990 Lokai et al. ............................ 372/32

OTHER PUBLICATIONS
"The Fast Frequency Stabilisation of an Argon Laser to an Optical Resonator Using an Extra-Cavity Electro-Optic Modulator", by Kerr et al., pp. 11–16.
"Laser Phase and Frequency Stabilization Using an Optical Resonator"; by R. W. P. Drever, pp. 97–105.
"Frequency-Stabilized Laser-Diode-Pumped Nd:YAG Laser", by Shoemaker et al., pp. 609–611.

Primary Examiner—Léon Scott, Jr.
Attorney, Agent, or Firm—Bell, Seltzer, Park & Gibson

[57] ABSTRACT

A laser system (10) comprises a microchip laser (11) longitudinally pumped by a laser diode (17). Lens system (18) focusses the pump radiation onto the lasing medium (12) which is in the form of a plate carrying a mirrored surface (13) forming one of the mirrors of the laser (11). The other mirror of laser (11) is formed on a substrate (14) mounted on a piezo-electric ceramic mount (15). Part (21) of the output of the laser (11) is delivered to a cavity (23) which functions as a interferometer the output of which is opto-electric converted at (26) and demodulated at (28) to provide a phase-shifted reference frequency with respect to an oscillator (16) operating at one of the mechanical reference frequencies of the unit formed by components (14) and (15). The reference frequency signal is amplified at (29) and fed with the oscillator output through a coupler (19) to drive the mount (15) so that it is both a frequency modulating and a frequency correcting element.

6 Claims, 1 Drawing Sheet

LASER SYSTEM

FIELD OF THE INVENTION

This invention relates to laser systems incorporating microchip lasers.

BACKGROUND OF THE INVENTION

Single-frequency microchip lasers are already known and have a cavity length which is extremely short (usually measured in microns) such that only a single longitudinal mode falls under the gain curve of the gain medium when pumped by a laser diode. These microchip lasers have good inherent frequency stability, but where very high frequency stability is required (such as optical communications) they may require frequency locking to a stable reference interferometer in order to overcome frequency fluctuations arising from intensity variations in the pump diode output, acoustic noise, or mechanical vibration of the microchip structure.

Locking of laser frequencies is itself known by diverting at least some of the laser output through an electro-optic phase modulator driven at a modulation frequency and at a very low modulation index (of the order 0.1) to generate sidebands which are applied to the reference interferometer in order to provide an error signal when the sideband signal is reflected from the reference interferometer. The error signal is then fed back to the laser to strain a piezo-electric mirror mount and thereby correctively change the cavity length and hence the frequency output of the microchip laser.

Electro optic phase modulators utilize birefringent crystals such as ADP, KDP, $LiNbO_3$ each of which is expensive to manufacture, requires very accurate angular orientation of its birefringent axes with respect to the optical axis of the laser system, in effect attenuates the available laser system output power, requires a polarized output from the laser, and a large drive power (typically of the order of 1 W), even for the low modulation index required because at the modulation frequencies concerned (10–100 MHz) such, crystals have significant capacitive impedance.

SUMMARY OF THE INVENTION

It is an object of the present invention to provide a new and improved laser system incorporating a microchip laser.

According to one aspect of the present invention there is provided a laser system incorporating a microchip laser having a piezo-electric mounted mirror and pumped by a laser diode, the system including an oscillator operating substantially at one of the mechanical resonance frequencies of the piezo-electric mounted mirror and connected via coupling means to drive the mount, means for diverting at least some of the laser output power to a reference interferometer having a resolution less than the resonance frequency, a photo-electric detector for converting the output of the interferometer, a phase-sensitive detector coupled to the output of the photo-electric detector and referenced to the output of the oscillator for providing a frequency locking signal, and means for applying the frequency locking signal to the coupling means whereby the mirror mount is controlled to function as both a frequency modulator and a frequency correction element.

Preferably the coupling means comprises a capacitive branch connected to the output of the oscillator and an inductive branch connected to the output of the applying means to provide mutual isolation between the oscillator and the applying means.

Preferably the interferometer comprises a Fabry Perot optical cavity aligned with the optical axis of the laser system, the output from the cavity being separated from the incoming beam by a quarter wave plate and a polarizing beam splitter. Alternatively, a Faraday isolator may be used. As a further alternative, the interferometer cavity may be off-axis whereby the cavity output is separated from the incoming beam by also being off-axis. Various other forms of interferometers may be utilised such as a confocal interferometer or a ring interferometer. The interferometer may utilise optical fibres.

Preferably the diverting means comprises a lens to match the diverted laser output to a mode of the optical cavity.

Another aspect the present invention provides a laser system incorporating a microchip laser having a piezo-electric mounted mirror and pumped by a laser diode, the system including an oscillator operating substantially at one of the mechanical resonance frequencies of the piezo-electric mounted mirror and connected via coupling means to drive the mount, means for diverting at least some of the laser output power to a reference interferometer having a resolution less than the resonance frequency and having means for setting the length of the interferometer cavity, a photo-electric detector for converting the output of the interferometer, a phase-sensitive detector for converting the output of the photo-electric detector and referenced to the output of the oscillator for providing a frequency locking signal, and means for applying the frequency locking signal to said setting means such that the laser and interferometer are frequency locked together.

In both aspects of the present invention an external ramp voltage signal of comparatively low voltage may be applied to augment the frequency locking signal derived by the phase-sensitive detector which provides the effect of scanning the laser frequency over a significant part of the gain profile of the gain medium. For example, for a gain medium of Nd:YAG a frequency scan of 100 $GH_z$ is practical. This frequency scan is possible because the length of the laser cavity is very short in microchip lasers and can be undertaken in only a few milliseconds with a relatively low voltage ramp signal.

By virtue of the present invention an electro-optic birefringent phase modulator is eliminated from the laser system and consequentially a high power oscillator is eliminated.

BRIEF DESCRIPTION OF THE DRAWINGS

An embodiment of the present invention will now be described by way of example with reference to the accompanying schematic drawing, in which FIG. 1 schematically illustrates a laser system.

DESCRIPTION OF PREFERRED EMBODIMENTS

Figure 1:
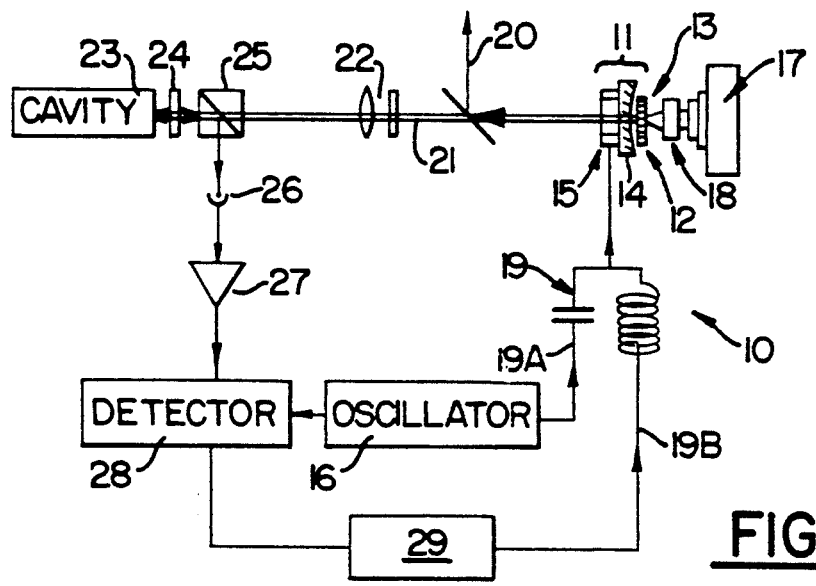

The laser system 10 which is shown in FIG. 1 comprises a microchip laser 11 the gain medium of which is a Nd:YAG plate 12 of 0.7 mm thickness and 3 mm diameter dielectrically coated on one surface 13 to provide one mirror of the laser. The other mirror of the laser 11 is provided at a separation from the plate 12 by a substrate 14 mounted on a piezo-electric ceramic ring 15, the substrate 14 having a radius of curvature of 20 mm and being dielectrically coated for 0.5% transmission at 1.3 microns. The length of the laser cavity is about 1 mm and is chosen to ensure that only one longitudinal mode can oscillate.

The laser 11 is pumped longitudinally by a GaAlAs laser diode 17 which is temperature controlled to emit at 807 nm at which wavelength the plate 12 is strongly absorbtive. The output from the diode 17 is collected by a lens system 18 which focuses the pump beam onto the plate 12. The lens system 18 has a coupling efficiency of about 85% and produces on plate 12 a spot size smaller than the $TEM_{oo}$ lasing mode spot size of 78 microns. Surface 13 of plate 12 is highly transmissive at about 805-810 nm and is highly reflective at about 1.3 microns.

Figure 2:
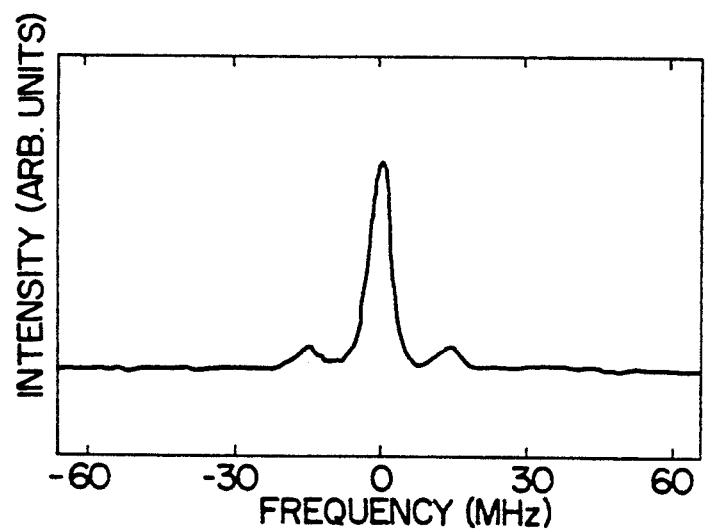
FIGS. 2 and 3 illustrate waveforms occurring in the FIG. 1 system.

The mount 15 is electrically driven by an electrical coupler 19 having a capacitive branch 19A connected to the output of an oscillator 16. Oscillator 16 operates substantially at one of the mechanical resonant frequencies of the unit formed by components 14 and 15 and causes the output from the laser 11 to have a frequency modulated spectrum (shown in FIG. 2) with a central frequency at Wc being determined by the nominal length of the laser-cavity, and only two sidebands at Wc $\pm$Wm where Wm is the oscillator frequency. The laser output beam is of single-longitudinal mode at 1.3 microns and linearly polarized with a maximum power of 10 mW when the pump power is at its limit of 100 mW.

Figure 3:
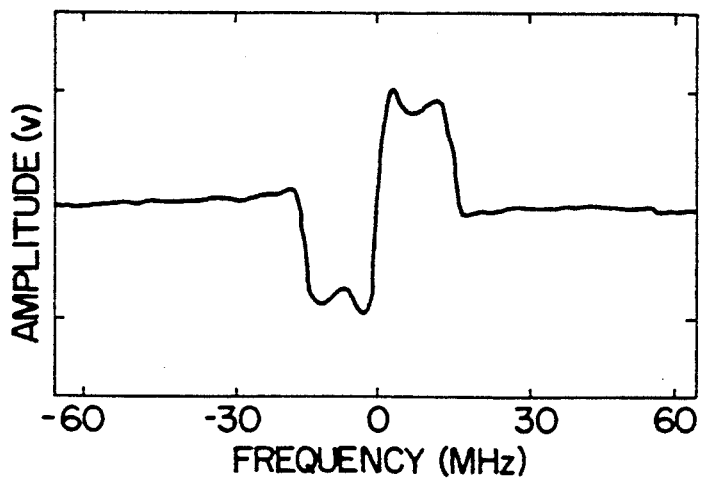

The output from the laser 11 is delivered on-axis to a beam splitter to provide a system output at 20 and a diverted output at 21 which is filtered and focused by elements 22 so s to be matched to the $TEM_{oo}$ mode of a 300 MHz free spectral range Fabry Perot cavity 23 located on-axis. The output of the cavity 23, which functions as a reference interferometer, is separated from the incoming beam by a quarter wave plate 24 and polarising beam splitter 25 and is delivered to a photo diode 26 to be converted to an electric signal. The output of photo diode 26 is amplified and filtered by component 27, having its band pass centered on the oscillator frequency, and demodulated by phase sensitive detector 28 which obtains a phase-shifted reference frequency from the oscillator 16. The output of the detector 28 is then delivered by amplifier 29 to an inductive branch 19B of the electrical coupler 19 whereby a frequency locking signal having a waveform as shown in FIG. 3 is applied to the mount 15.

The oscillator frequency Wm is in the range 10-100 MHz whereas the laser frequency Wc is about 10 7 times greater and the side bands which are produced by the laser 11 are frequency separated by an amount greater than the resolution of the interferometer 23. The frequency locking signal provided by the detector 28 is dependent upon the amplitude and phase imbalance of the two side bands and is comparatively low frequency. It is isolated from the oscillator 16 by capacitive branch 19A whilst the oscillator frequency is isolated from the detector 28 by the inductive branch 19B. The signals on both branches 19A, 19B however combine to drive the mount 15 so that it is both a frequency modulating and frequency correcting element. The modulation index is low, of the order of 0.1, so that virtually all of the laser output power is at the laser carrier frequency and only two small amplitude side bands are produced, which are used for sideband frequency locking. The drive power required for the mount 15 is less than about 10 mW and it does not absorb laser output power. Typically the peak to peak excursion of the mirror 14 is about 0.1 nm.

In a modified arrangement, the output of amplifier 29 is fed to control the length of the cavity 23 when the latter is of adjustable length and is provided with a means for setting the cavity length. The setting means may for example be a piezo-electric mount. In this case laser mount 15 is driven only by the coupling element 19A and the laser and interferometer are frequency locked together but are free to drift within the inherent stability of either.

The amplifier 29 may be provided with an additional input to receive a low voltage ramp signal for the purpose of scanning the laser frequency over the range provided by the single mode which falls under the gain curve of the laser.

I claim:

1. A laser system comprising:
   a microchip laser having a mirror mounted on a piezo-electric mount;
   a laser diode which pumps said microchip laser;
   an oscillator operating substantially at a mechanical resonance frequency of said piezo-electric mounted mirror and;
   coupling means for electrically coupling a first output of said oscillator to said piezo-electric mount;
   a reference interferometer having frequency resolution less than said mechanical resonance frequency;
   diverting means for diverting at least some of an optical output of the laser to said reference interferometer;
   a photo-electric detector for converting an output of the interferometer to an electrical signal output;
   a phase-sensitive detector coupled to an output of the photo-electric detector and referenced to a second output of the oscillator to provide a frequency locking signal; and
   applying means coupled to an output of the phase sensitive detector for applying the frequency locking signal to said coupling means such that the mirror mount is controlled and functions as both a frequency modulator and a frequency correction element.

2. A system as claimed in claim 1, wherein said coupling means comprises a capacitive branch connected between the first output of the oscillator and said piezo-electric mount and an inductive branch connected between an output of the applying means and said piezo-electric mount to thereby provide mutual isolation between the oscillator and the applying means.

3. A system as claimed in claim 1 or claim 2, wherein said interferometer comprises a Fabry Perot optical cavity aligned with an optical axis of the laser system, an output from the Fabry Perot optical cavity being separated from an incoming beam by a quarter wave plate and a polarizing beam splitter.

4. A system as claimed in claim 3, wherein said diverting means comprises a lens to match the diverted laser output to a mode of the Fabry Perot optical cavity.

5. A system as claimed in claim 1 or claim 2, wherein the interferometer comprises a cavity which is located off-axis with respect to an incoming beam from the microchip laser.

6. A laser system comprising:
   a microchip laser having a mirror mounted on a piezo-electric mount and;
   a laser diode which pumps said microchip laser;

an oscillator operating substantially at a mechanical resonance frequency of said piezo-electric mounted mirror;

coupling means for electrically coupling a first output of said oscillator to said piezo-electric mount;

a reference interferometer having a resonant cavity and having setting means for setting the length of the resonant cavity;

diverting means for diverting at least some of an optical output of the laser to said reference interferometer;

a photo-electric detector for converting an output of the interferometer to an electrical signal output;

a phase-sensitive detector coupled to an output of the photo-electric detector and referenced to a second output of the oscillator to provide a frequency locking signal; and applying means for applying the frequency locking signal to said setting means such that the laser and the interferometer are frequency locked together.

* * * * *